United States Patent
Holst, III et al.

(10) Patent No.: US 12,379,896 B2
(45) Date of Patent: *Aug. 5, 2025

(54) SYSTEM AND METHOD FOR VOICE RECOGNITION USING A PERIPHERAL DEVICE

(71) Applicant: John Holst, III, St. Louis, MO (US)

(72) Inventors: John Holst, III, St. Louis, MO (US); Dave Jones, St. Louis, MO (US)

(73) Assignee: John Holst, III, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/444,116

(22) Filed: Feb. 16, 2024

(65) Prior Publication Data

US 2024/0184520 A1 Jun. 6, 2024

Related U.S. Application Data

(63) Continuation of application No. 17/672,424, filed on Feb. 15, 2022, now Pat. No. 11,914,924, which is a
(Continued)

(51) Int. Cl.
*G10L 15/22* (2006.01)
*G06F 3/01* (2006.01)
(Continued)

(52) U.S. Cl.
CPC ............. *G06F 3/167* (2013.01); *G06F 3/016* (2013.01); *G06F 3/03544* (2013.01); *G06F 3/0488* (2013.01); *G10L 15/26* (2013.01); *G10L 15/22* (2013.01); *G10L 2015/221* (2013.01); *G10L 2015/225* (2013.01)

(58) Field of Classification Search
CPC . G06F 3/167; G06F 3/16; G06F 3/016; G06F 3/01; G06F 3/03544; G06F 3/0354; G06F 3/0488; G06F 3/03543; G10L 15/08; G10L 15/26; G10L 2015/221;
(Continued)

(56) References Cited

U.S. PATENT DOCUMENTS 6,804,817 B1    10/2004   Kimura et al.
8,255,218 B1 *   8/2012   Cohen ..................... G06F 3/167
                                                          709/200

(Continued)

*Primary Examiner* — Huyen X Vo
(74) *Attorney, Agent, or Firm* — Womble Bond Dickinson (US) LLP

(57) ABSTRACT

A system and method for dictation using a peripheral device includes a voice recognition mouse. The voice recognition mouse includes a microphone, a first button, a processor coupled to the microphone and the first button, and a memory coupled to the processor. The memory stores instructions that, when executed by the processor, cause the processor to detect actuation of the first button and in response to detecting actuation of the first button, invoke the microphone for capturing audio speech from a user. The captured audio speech is streamed to a first module. The first module is configured to invoke a second module for converting the captured audio speech into text and forward the text to the first module for providing to an application expecting the text, the application being configured to display the text on a display device.

20 Claims, 5 Drawing Sheets

Related U.S. Application Data continuation of application No. 16/526,728, filed on Jul. 30, 2019, now Pat. No. 11,288,038.

(60) Provisional application No. 62/712,152, filed on Jul. 30, 2018.

(51) Int. Cl.
  *G06F 3/0354* (2013.01)
  *G06F 3/0488* (2022.01)
  *G06F 3/16* (2006.01)
  *G10L 15/26* (2006.01)

(58) Field of Classification Search
  CPC .............. G10L 2015/225; G10L 15/22; G10L 21/0208; G10L 15/28
  See application file for complete search history.

(56) References Cited

U.S. PATENT DOCUMENTS

| | | |
|---|---|---|
| 9,627,162 B1 | 4/2017 | Wu |
| 2001/0037201 A1 | 11/2001 | Keiller et al. |
| 2003/0028382 A1* | 2/2003 | Chambers ............... G10L 15/26 |
| | | 704/E15.045 |
| 2003/0229493 A1 | 12/2003 | McIntyre et al. |
| 2007/0008284 A1* | 1/2007 | Kim ................... G06F 3/03543 |
| | | 345/163 |
| 2014/0270248 A1 | 9/2014 | Ivanov et al. |
| 2018/0012617 A1 | 1/2018 | Salishev |
| 2018/0146081 A1 | 5/2018 | Brenner et al. |

* cited by examiner

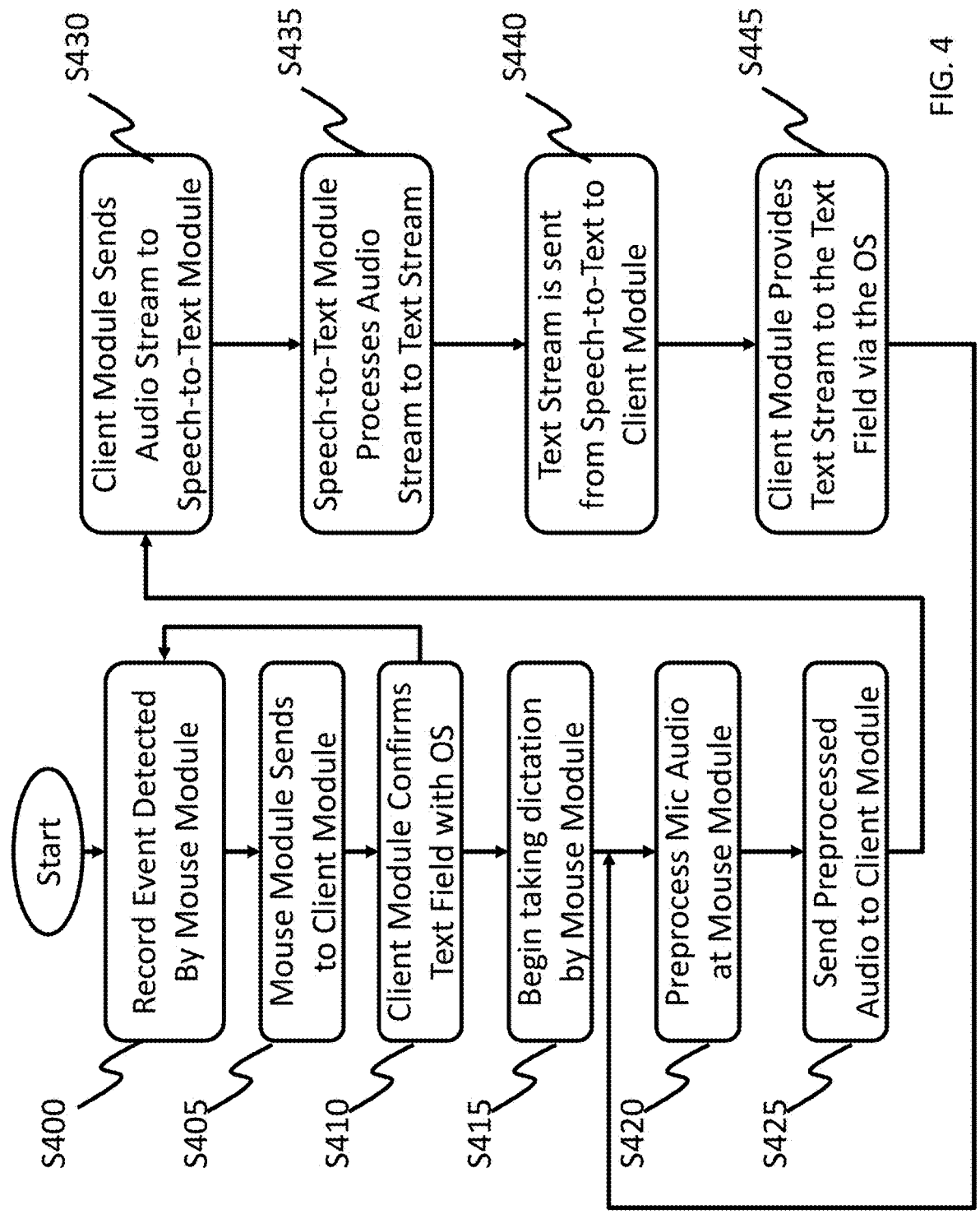

SYSTEM AND METHOD FOR VOICE RECOGNITION USING A PERIPHERAL DEVICE

CROSS-REFERENCE TO RELATED APPLICATION

This application is a continuation of and claims priority to and the benefit of U.S. patent application Ser. No. 17/672,424 filed Feb. 15, 2022, which is a continuation of and claims priority to and the benefit of U.S. patent application Ser. No. 16/526,728 filed Jul. 30, 2019, now U.S. Pat. No. 11,288,038, which claims priority to and the benefit of Provisional Application No. 62/712,152, filed on Jul. 30, 2018, entitled "SYSTEM AND METHOD FOR DICTATION USING A PERIPHERAL DEVICE", the entire content of each of which is incorporated herein by reference.

BACKGROUND

1. Field

Some embodiments of the present disclosure relate generally to peripheral computing devices and voice recognition.

2. Description of the Related Art

Peripheral devices are used for providing input to, and receiving output from, computing systems (e.g., servers, personal computers, laptops, tablets, smart phones, etc.). Peripheral devices generally include input devices such as keyboards, mice, and microphones, and output devices such as monitors, speakers, and printers.

The computer mouse in particular is typically deemed to be an important peripheral device. For years, the mouse has been one of the primary mechanisms of interaction between a user and the computing system, allowing users to point, click, and scroll through graphical user interfaces. A typical mouse includes a motion capture device for measuring two dimensional motion, such as an optical sensor/light source. A typical mouse also includes two or three buttons, and a scroll wheel.

When an input to be provided to the computing system is text, a keyboard is typically invoked. However, with the advance of speech recognition technology, dictation is now a feasible alternative to the use of keyboards. The processing of the user' dictation is via a speech-to-text/dictation program (also referred to as speech recognition software) generally installed in the computing system. Speech-to-text programs are often inconvenient to use, requiring the launching of the speech recognition software prior to use, and notifying the software when you wish to start and stop dictating (e.g., by clicking a start/stop icon). If speech input is desired for another computing device, that other computing device must generally be equipped with its own microphone and speech recognition software in order to allow dictation to the other computing device.

Speech recognition software, once installed in a particular computing device, relies on a microphone that is either built-in or separate from the computing device to capture the user's spoken words. Accurate conversion of speech to text is often dependent on the ability to accurately capture such words. Built-in microphones are often of low quality and may be located far from a user. Separate microphones can be of higher quality, but come at the price of using an additional peripheral device. Having multiple peripheral devices may be inconvenient when using a portable computing device. A more streamlined approach that is easier to use is therefore desired.

The above information is only for enhancement of understanding of the background of embodiments of the present disclosure, and therefore may contain information that does not form the prior art.

SUMMARY

In various embodiments, a system and method for dictation using a peripheral device includes a voice recognition mouse. In various embodiments, the voice recognition mouse includes a microphone, a first button, a processor coupled to the microphone and the first button, and a memory coupled to the processor. The memory stores instructions that, when executed by the processor, cause the processor to, detect actuation of the first button and in response to detecting actuation of the first button, invoke the microphone for capturing audio speech from a user. The captured audio speech is streamed to a first module, wherein the first module is configured to invoke a second module for converting the captured audio speech into text, and forward the text to the first module for providing to an application expecting the text, the application being configured to display the text on a display device.

In various embodiments, the instructions further cause the processor to generate a first mouse event, transmit the first mouse event to the first module, receive notification from the first module, and invoke the microphone in response to receipt of the notification from the first module.

In various embodiments, the voice recognition mouse further includes a communications link and the first module operates on a separate computing system from the voice recognition mouse and the first mouse event is transmitted to the first module via the communications link.

In various embodiments, the microphone includes a microphone array, and capturing audio speech comprises capturing audio speech from each microphone in the array.

In various embodiments, a beamforming algorithm is applied to the captured audio speech from the microphone array and stream the beamformed captured audio speech.

In various embodiments, the instructions further cause the processor to perform noise filtering on the captured audio speech by applying at least one filter.

In various embodiments, the voice recognition mouse further includes a haptics unit, wherein the haptics unit is invoked to provide a tactile feedback according to a state of the voice recognition mouse.

In various embodiments, the voice recognition mouse further includes a touch sensor configured to detect when a user proximity and power up the voice recognition mouse based on the user proximity.

In various embodiments, the voice recognition mouse further includes an second button, and in response to detecting actuation of the second button, the instructions further cause the processor to generate a second mouse event, transmit the second mouse event to the first module, and provide a command to the application to remove the text.

In various embodiments, a voice recognition system includes a voice recognition mouse having an embedded microphone for capturing audio speech from a user and a computing system coupled to the voice recognition mouse via a communications link, the computing system having a processor and a memory. The memory stores instructions that, when executed by the processor, cause the processor receive a first event from the mouse and in response to receiving the first event, transmit a notification to the voice recognition mouse for receiving the captured audio speech from the mouse, transmit a request for converting the received audio speech into text, and receive the text in response, and provide the received text to an application expecting the text, the application being configured to display the text on a display device.

In various embodiments, the voice recognition mouse includes a first button, a processor coupled to the embedded microphone and the first button, and a memory coupled to the processor. The memory stores instructions that, when executed by the processor, cause the processor to detect actuation of the first button, generate the first event in response to the detected actuation of a first button, send the first event to the computing system, and invoke the embedded microphone in response to receipt of the notification from the computing system to capture audio speech.

In various embodiments, the instructions further cause the processor to, in response to receiving the first event from the mouse, determine that at least one of a current location of a mouse pointer or a selected field of the application, is capable of receiving the text.

In various embodiments, the current location of the mouse pointer or the selected field of the application are determined by querying an operating system of the computing system.

In various embodiments, the instructions further cause the processor to format the received audio speech in accordance with an application programming interface.

In various embodiments, the request for converting the received audio speech into text is sent to a voice recognition system operating on a cloud server.

In various embodiments, a method of performing voice recognition includes detecting an actuation of a first button of a voice recognition mouse, invoking a microphone of the voice recognition mouse for capturing audio speech from a user, and streaming the captured audio speech to a first module, wherein the first module is configured to invoke a second module for converting the captured audio speech into text, and forward the text to the first module for providing to an application expecting the text, the application being configured to display the text on a display device.

In various embodiments, the method of performing voice recognition of claim 16, further includes generating a first mouse event upon detecting the actuation of the first button, transmitting the first mouse event from the voice recognition mouse to the first module, receiving notification from the first module by the voice recognition mouse, and invoking the microphone in response to receipt of the notification from the first module.

In various embodiments, the microphone includes a microphone array and the method further includes performing beamforming using the microphone array to capture the audio speech from the user.

In various embodiments, the method further includes detecting actuation of a second button on the voice recognition mouse, generating a second mouse event in response to detecting the actuation of the second button, transmitting the second mouse event to the first module, and providing a command to the application to remove the text by the first module.

In various embodiments, the method of performing voice recognition further includes filtering the captured audio speech using at least one filter.

BRIEF DESCRIPTION OF THE DRAWINGS

Some embodiments can be understood in more detail from the following description taken in conjunction with the accompanying drawings, in which:

FIG. 4 depicts a block diagram showing the operational flow for using the voice recognition peripheral.

DETAILED DESCRIPTION

Figure 1:
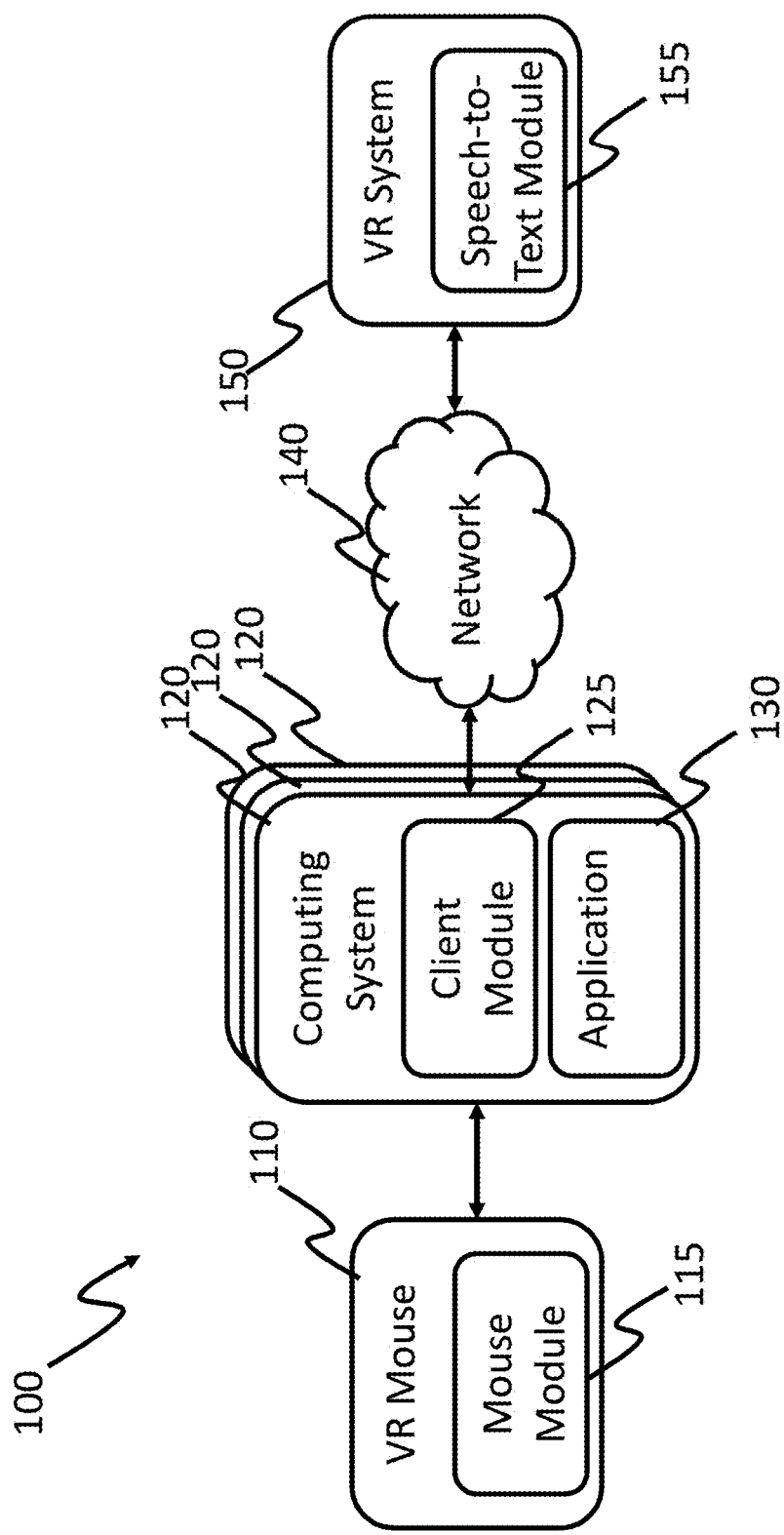
FIG. 1 depicts a block diagram of the modules for operating the voice recognition peripheral according to various embodiments of the present invention.

Features of the inventive concept and methods of accomplishing the same may be understood more readily by reference to the following detailed description of embodiments and the accompanying drawings. Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof will not be repeated. The drawings are not necessarily to scale and the relative sizes of elements, layers, and regions shown may be exaggerated for clarity.

Embodiments of the present disclosure include a system and method for voice recognition (VR) using a peripheral device (hereinafter "VR mouse system"). In various embodiments, such a VR mouse system includes an enhanced computer mouse (hereinafter "VR mouse"), a computing system coupled to the VR mouse, and a voice recognition system (which may or may not be separate from the VR mouse and/or computing system). In one embodiment, the VR mouse provides the functionality of a traditional computer mouse, but is enhanced with an integrated microphone for voice recognition.

In one embodiment, the computing system coupled to the computer mouse hosts a client module for receiving audio streams captured by the computer mouse using the microphone. The client module sends the audio streams to the voice recognition system which invokes a speech-to-text module for converting the captured audio stream to a text stream. The text stream is then sent back to the client module to provide to an application operating on the computing system. The text is then entered into a currently selected area of the application. For example, the text may be inserted into a currently selected fillable form in a web browser, in a word processor document that the mouse is currently pointing at, or any other suitable space for entering text that the user has selected or that the mouse is pointing at. Although in one embodiment streaming technology is contemplated for converting the received audio into text, a person skill in the art should recognize that the audio may also be processed in stages or in bulk as will be appreciated by a person of skill in the art. For example, dictated speech received from the start of a dictation session (e.g. via actuation of the record button) until the end of dictation session (e.g. via actuation of the record button again) may be processed together in bulk.

The VR mouse system of the various embodiments which allows voice recognition by employing a computer mouse provides a plurality of benefits over conventional VR solutions. The VR mouse according to the various embodiments provides a single peripheral device that is client agnostic (e.g., device and operating system agnostic). For example, the client module that receives the dictated audio from the mouse, and the application that uses the transcribed text, may be installed on a variety of different platforms and operating systems ranging from smart phones to laptops. The VR mouse also provides for better portability when compared to traditional voice recognition systems that require a separate microphone for voice recognition in addition to a traditional mouse. Furthermore, the VR mouse may be used in multiple environments, ranging from a traditional office space to a vehicle. In addition, in various embodiments, the VR mouse includes an improved microphone and digital signal processing (DSP) circuitry to allow for beamforming and filtering to provide a better signal-to-noise ratio when compared to traditional systems. The inclusion of the DSP and beamforming also allows the VR mouse to be used in a variety of situations. For example, in various embodiments, the VR mouse may be used to record a conversation in a room from a distance, and the beamforming array may function to effectively point the microphone at the speaker even when the speaker is moving.

In various embodiments, the VR mouse provides for an easy installation. For example, the installation of the client module on the computing system may occur when the VR mouse is detected for use with the device (e.g., when it is connected via USB or Bluetooth). For example, the installation of the client module may occur concurrently with installation of a driver for the VR mouse. The installation may utilize a wide area network such as, for example, the Internet. For example, the installation may download the client module using the Internet or other network. In some embodiments, the client module may be part of the mouse driver, eliminating the need of downloading a separate application. In some embodiments, the client module may already be included with the operating system of the computing system.

A user may use the VR mouse on each of his or her devices simply by interacting with the mouse. In some embodiments, the VR mouse may be used on multiple devices at the same time, thereby allowing the user to dictate into multiple text fields at the same time.

Some typical voice recognition systems have the disadvantage of requiring the user to utilize a graphical user interface to activate and deactivate the system. Other typical systems have the disadvantage of using a separate physical device. The VR mouse according to an exemplary embodiment integrates voice recognition controls into the mouse to allow for easier user interaction with the system when voice recognition is initiated. For example, in various embodiments, the VR mouse provides one or more conveniently located buttons for activating/deactivating voice recognition functionalities of the system. A user is thus able to use the mouse to point to a where he would like to insert text, click a record button on the mouse, and begin speaking. The record button may be selected again to stop the dictation/recording by the VR mouse. Furthermore, any errors can be quickly corrected by utilizing, for example, an on-mouse undo button which, when depressed, undoes the insertion of text. Although the term "button" is used as an example, a person of skill in the art should recognize that the described buttons may be replace with other modes of actuation such as, for example, knobs, dials, or the like.

Conventional VR systems are also limited in that they are tied to a single VR system. The VR mouse system of the various embodiments may utilize any VR platform for performing speech-to-text conversion. For example, in some embodiments, the VR mouse system may use a proprietary speech-to-text module that operates on the VR mouse. However, in other embodiments, the speech-to-text operations may be performed on a module operating on the user's device or in the cloud. By allowing the speech-to-text module to reside on the cloud, changes or updates may be made to the speech-to-text module without having to modify replace the VR mouse 310 or client module 325. Also, a speech-to-text module separate from the VR mouse allows flexibility in the choice of VR system to use to provide the speech-to-text functionality. Thus, the VR mouse system of the various embodiments allows for the speech-to text functionality to be utilized flexibly in a variety of locations to provide the best available speech to text functionality while not draining the mouse battery. For example, in some embodiments, the VR mouse may be used globally regardless of language by using a language specific local service.

FIG. 1 is a schematic block diagram of the components of a VR mouse system according to one exemplary embodiment of the invention. In various embodiments, the VR mouse system 100 includes a mouse module 115 operating on a VR mouse 110, a client module 122 operating on a computing system 120, and a speech-to-text module 155 operating on a voice recognition system 150. In the exemplary embodiment of FIG. 1, the computing system 120 is connected to the VR system 150 via a data communications network 140 such as a local area network, private wide area network, or a public wide area network such at the Internet.

In various embodiments, the mouse module 115 that is hosted by the VR mouse 110 is configured to record a user's speech, and perform beamforming and preprocessing of the user's speech. In one embodiment, the audio data resulting from the preprocessing of the user's speech is packaged into audio packets and streamed to the one or more computing systems 120 over a data communications link. The data communications link connecting the VR mouse 110 to the one or more computing systems 120 may be any suitable wired or wireless data connection, such as, for example, a USB, Bluetooth, Wi-Fi, or the like.

In various embodiments, the client module 125 that is hosted by the computing system 120 provides an interface between various components of the system 100. For example, the client module 125 may be configured to provide an interface between the VR mouse 110 and the computing system 120. In this regard, the client module 125 may subscribe to receive outputs of the mouse module 115. The various outputs from the mouse module 115 (also referred to as mouse events) may cause corresponding actions by the client module 125, and thereby computing system 120 and the application 130. When certain mouse events are detected (e.g., when the mouse cursor is located at a location capable of receiving text or when a location capable of receiving text has been selected), the client module 125 may signal the mouse module 125 to record and stream audio data of the words dictated by the user.

For example, a user may click the record button to initiate speech recognition. Clicking the record button may result in the mouse module generating a record event which is then provided to the client module 125. Upon receiving the record event, the client module 125 may determine if the location of the cursor (or selected field) is in a fillable text field, such as a document, webpage, etc. In some examples, the determination of the location of the mouse cursor (or selected field) may be achieved by querying the operating system of the computing system or the application 130. In some embodiment, the location may be known by the mouse module 115. In this case, the location information (e.g. cursor x and y coordinates) is provided to the client module 125 along with the detected mouse event.

When the client module 125 detects that the cursor is at an accessible text field, the client module 125 notifies the mouse module 115 to begin recording audio and streaming audio data. However, if the cursor is not at an accessible field, the client module 125 notifies the mouse module 115 to not record audio, or refrains from sending a command to begin the recording.

In one embodiment, recording continues until the user selects the record button again. The typical functionalities of the mouse (e.g. scrolling, pointing, clicking, etc.) may be disabled when the microphone is enabled on the mouse for receiving the dictated speech. In this regard, a flag or other like value may be set by the mouse module when the microphone is active. The mouse module may check the flag prior to responding to the user's commands via the mouse. The commands may be ignored while the flag is set. In other embodiments, the commands may be queued until they can be acted upon (e.g. when the flag is unset).

In one embodiment, the client module 125 interfaces with the speech-to-text module 155 for sending the received audio data to the speech-to-text module 155, and receiving the corresponding text data for providing it to the application 130 for insertion.

In the depicted embodiment, the speech-to-text module 155 is hosted by the VR system 150. The VR system 150 may be cloud services system operating a commercially available speech-to-text module 155. In other embodiments, the speech-to-text module 155 may operate on the computing system 120 or the VR mouse 110. Regardless of the location of the speech-to-text module 155, the speech-to-text module is configured in receive the audio stream from the client module 125, convert the audio stream to a text stream in near real time, and provide the text stream back to the client module 125. In this regard, the speech-to-text module 155 may have an application program interface (API) with various requirements for providing input and receiving output. Once the speech-to-text module 155 has converted the audio received from the client module 125 to a text stream, it transmits the text stream to the client module 125 according to the API. The client module repackages the text into a format acceptable by the application 130. For example, the client module 125 may format the text stream to be similar to a keyboard text stream. Thus, the application 130 receives the text in a manner that appears conventional, without any indication that the user has used the VR mouse system to dictate the text as opposed to having typed it.

In one embodiment, the client module 120 may be pre-configured with the information on the VR system 150 that is to be invoked for processing the audio stream. In some embodiments, a user may select a desired VR system 150 from a list of available VR systems.

Figure 2A:
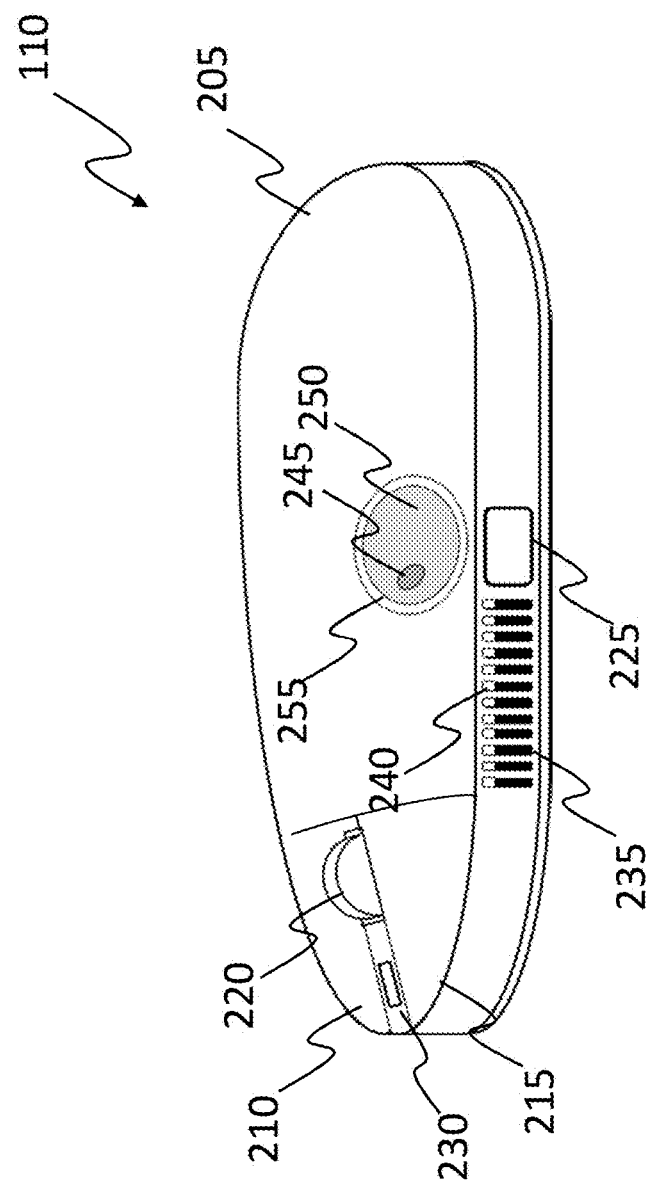
FIGS. 2A-2B depict a voice recognition peripheral device according to various embodiments of the present invention.
Figure 2B:
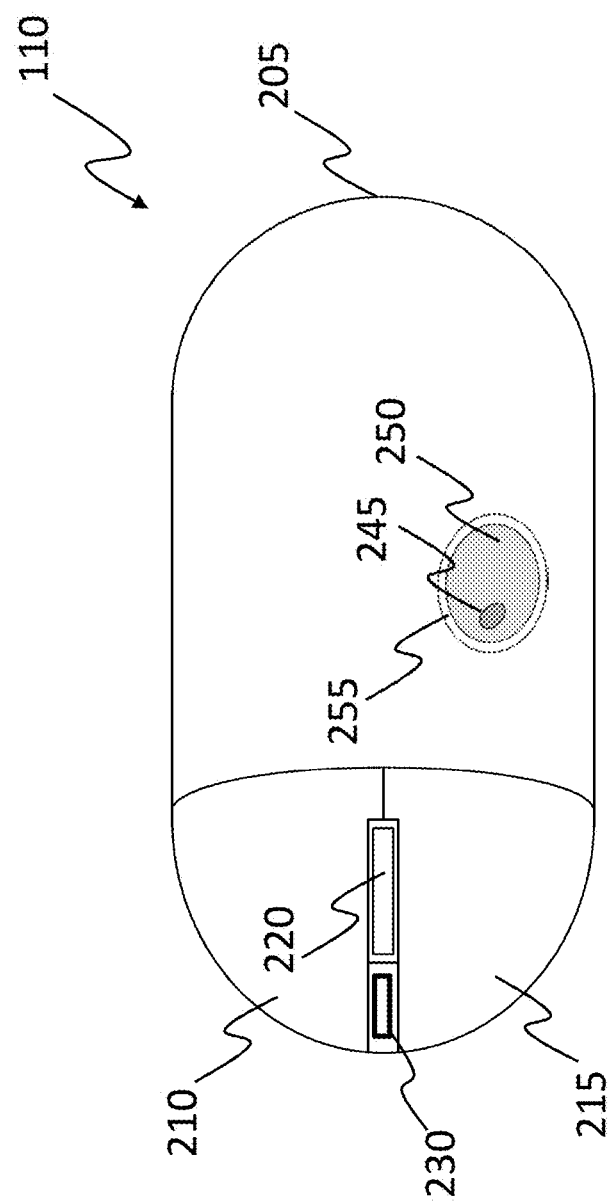

In various embodiments, the client module 125 may also provide verification of services for the VR mouse system 100. For example, the client module 125 may provide any licensing or counterfeit verification to ensure that the user has the appropriate license to use the system itself and the VR system 150/speech-to-text module 155. The client module 125 may also generate an alert in the case of a breakdown in operation. The alert may be displayed on the computing system 120 or may be indicated by the mouse 110 using the haptics, LEDs, or an embedded speaker FIGS. 2A and 2B are different views of a voice recognition peripheral device 110 according to one exemplary embodiment of the invention. In the embodiment of FIGS. 2A and 2B, the peripheral device is a VR mouse. VR mouse 110 may be similar to the VR mouse 110 of FIG. 1. In various embodiments, the VR mouse 110 may include components for performing typical mouse functions (e.g., providing information related to the two-dimensional movements of the mouse and click events). For example, the VR mouse 110 includes a housing 205 having a shape that is ergonomic for a user's hand. The VR mouse 110 includes right and left click buttons 210, 215 and a scroll wheel 220. The VR mouse 110 also includes an optical sensor and light source (not depicted) located on the bottom of the housing 205 for tracking the two-dimensional movements of the VR mouse (e.g., an LED or laser and corresponding sensor). In some embodiments, the VR mouse 110 may include batteries and a voltage converter (e.g., a boost converter) for powering the VR mouse 110.

In various embodiments, the VR mouse 110 further includes additional features for performing VR functions. For example, the VR mouse 110 may include a VR record button 225, an undo button 230, a touch surface 235, LED level indicators 240, a microphone array 245, a microphone dish 250, and a microphone LED 255. In various embodiments, the VR record button 225 allows for the activation and deactivation of recording for the VR mouse system. As shown in FIGS. 2A-2B, the VR record button 225 may be conveniently located at a left side of the VR mouse 110 so that the user may turn the system on and off using their thumb which is naturally located at or near the VR record button 225 when using the VR mouse 110. However, in other embodiments, the VR record button 225, the touch surface 235, the level indicators 240, microphone array 245, microphone dish 250 and the microphone LED 255 may be located on the right side of the VR mouse 110 to accommodate a left-handed user.

In various embodiments, the microphone LED 255 is configured to be illuminated according to a user pressing the VR record button 225 (e.g., to illuminate when the system is recording). In various embodiments, the undo button 230 is located in front of the scroll wheel 220 and between the right and left click buttons 210, 215. The location of the undo button 230 also provides easy user access since the user's middle finger generally rests on the scroll wheel 220 while operating the VR mouse. However, in other embodiments, the undo button 230 may be located on a side of the mouse body 205 (e.g., adjacent to the VR record button 225) or any other suitable location.

In various embodiments, the microphone array 245 and microphone dish 250 are positioned to naturally fall between the gap in a user's hand between a thumb and pointer finger when the user is using the VR mouse 110. The microphone array 245 and microphone dish 250 may be pointed up and backwards (relative to the VR mouse 110) to point towards the user's mouth. In various embodiments, the microphone array 245 includes at least one MEMS microphone. For example, the microphone array 245 may include a plurality of MEMS microphones positioned and aligned in various orientations that are configured to capture audio data and convert the audio data into a digital audio stream.

In various embodiments, the touch surface 235 (i.e., a touch sensor) also included in the VR mouse 110 provides an additional way for a user to interact with the VR mouse system. For example, the touch surface 235 may be used to track a user touching or sliding a finger across the touch surface 235. The system may be configured such that a touch works similar to the record button 225 and a slide may work similar to the undo button 230. However, the touch surface 235 can be configured to control any event. In various embodiments, the touch surface 235 may be constructed using a flexible Kapton® (Kapton® is a registered trademark of E. I. Du Pont de Nemours and Company Corporation of Delaware), conductive ink, or rigid material. The touch surface 235 may be configured to measure changes in resistance or capacitance to determine user touches.

In various embodiments, the VR mouse 110 also includes LED indicators 240 to indicate a status of the VR mouse 110. For example, the LED indicators 240 may be used to indicate a battery level, a volume of a user's speech, or any other suitable system status.

Figure 3:
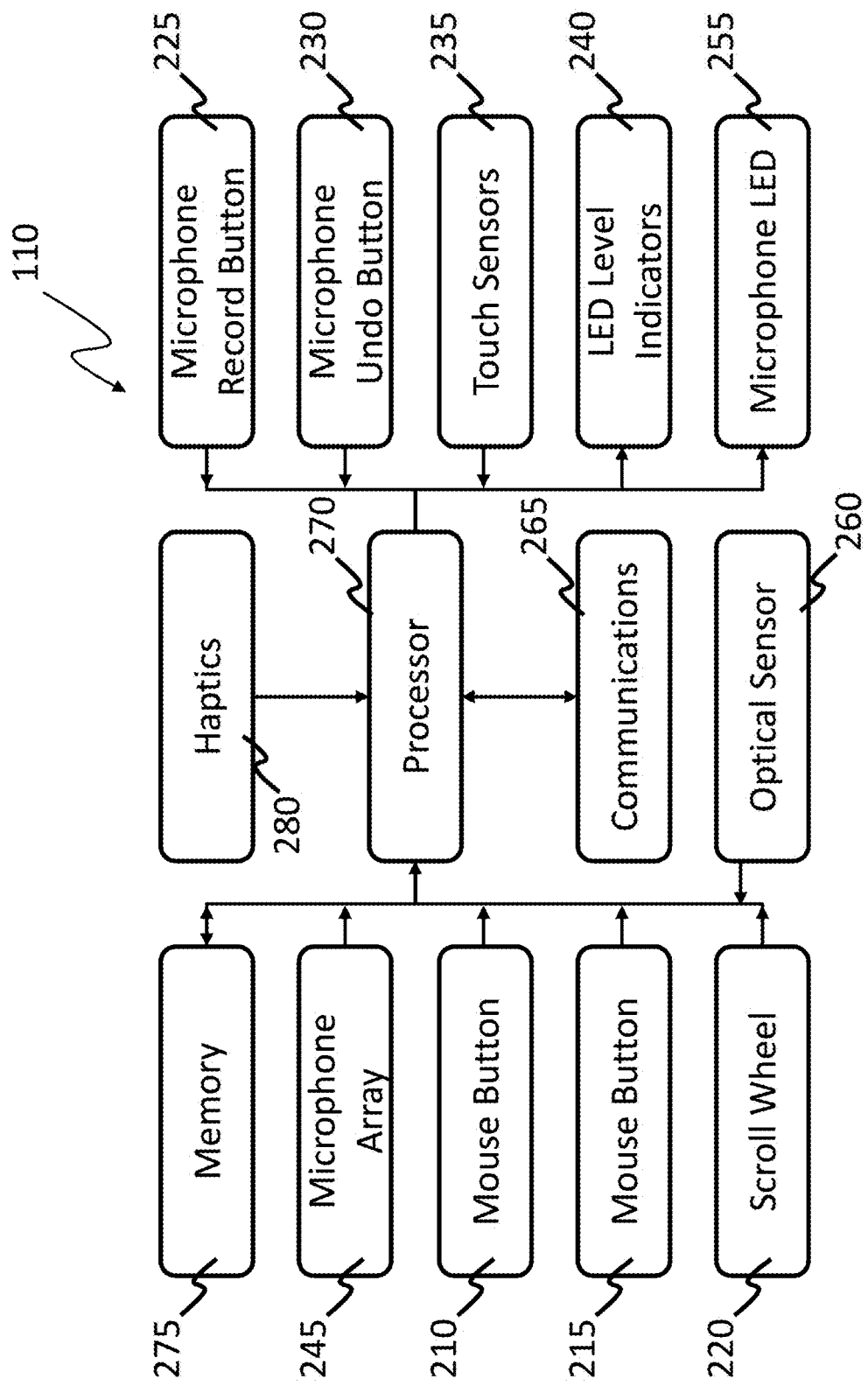
FIG. 3 depicts a block diagram of the hardware components of the voice recognition peripheral device according to various embodiments of the present invention.

FIG. 3 is a schematic block diagram of the components in a VR mouse 110 according to one exemplary embodiment of the invention. VR mouse 110 may be similar to the VR mouse 110 of FIG. 1 and the VR mouse 110 of FIGS. 2A-2B. In the embodiment of FIG. 3, the VR mouse 110 includes mouse buttons 210, 215 for making right and left clicks and a scroll wheel 220. The VR mouse 110 also includes an optical sensor/light source 260 for measuring the two-dimensional movements of the mouse 110 on a surface. As discussed above, the VR mouse 110 also includes a record button 225 and an undo button 230. Each of the buttons 210, 215, 220, 225, 230 may be connected to a communications link 265 via a processor 270. In various embodiments, the button click events may be packaged by the processor 270 into legacy mouse device messages, while in other embodiments, the button click events may be sent according to a VR mouse 110 proprietary message that is interpreted by the client module 125.

In various embodiments, the communications link 265 is configured for sending to and receiving data from the computing system 120. The communications link 265 may operate using an industry standard or publically known format. In various embodiments, the communications link 265 may include a wired connection such as a USB or PS/2. In other embodiments, the communications link 265 may include a wireless connection such as a WiFi, Bluetooth, A2B, or other wireless communications link.

In various embodiments, the processor 270 is connected to a memory 275 for storing instructions that implement the functionalities of the mouse module 115 to perform various functions and enhancements for the VR mouse 110. For example, the processor 270 may be configured to receive audio from the microphone array 245 and implement beamforming algorithms to improve the quality (e.g., improve the volume of the recorded user's voice and reduce background noise) of the user's speech. The processor 270 may also be configured to perform preprocessing on the incoming speech. For example, the processor 270 may perform noise filtering on the incoming speech. The processor 270 may therefore implement various notch and/or bandpass filters according to the incoming data stream (speech). In various embodiments, the processor 270 may be configured to operate a speech-to-text module 155 for converting the audio stream to a text stream. However, in order to reduce power consumption and improve processing time, in other embodiments, the speech-to-text module 155 may operate on a separate device (e.g., a remote device) that is connected via the communications link 265. In these embodiments, after preprocessing the audio data, the processor 270 may also package the data into an industry standard format before providing the packaged data to the communications link 265. In various embodiments, the processor 270 may also be configured to process any user interaction with the touch sensors 235.

In various embodiments, the processor 270 is also configured to control a device haptics unit 280. For example, the haptics unit 280 may include one or more vibrating motors for providing feedback to the user. The processor 270 may activate the haptics unit 280 based on a current state or change in state of the VR mouse 110. In various embodiments, the state may be based on the current processing of voice recognition and/or system battery life. For example, the state may include beginning recording, ending recording, currently recording, low battery, or any other suitable state.

In some embodiments, the processor 270 may perform power saving operations. For example, the processor 270 may put the VR mouse 110 into a sleep state to conserve power after a period (e.g., a preset time period) of non-use. The VR mouse 110 may include a proximity wake feature that utilizes a capacitive proximity input (e.g., using the touch sensor 235) to detect when the user is nearby and power up the device to reduce any usage delays associated with wirelessly connecting to the user device. The proximity sensor wake feature may also be used to activate the microphone array 245 when the user is nearby.

FIG. 4 is a flow diagram of a process for receiving and processing speech input according to one exemplary embodiment of the invention. Referring to FIG. 4 and with continued reference to FIGS. 1-3, in various embodiments, the client module 125 listens (e.g., substantially continuously or periodically) for events generated by the mouse module 115 in response to user actions. For example, when the user clicks the record button 225, the mouse module 115 records the click and generates a record event (S400). The mouse module 115 transmits the generated record event to the client module 125 subscribed to receive mouse events (S405). The receiving client module 125 determines whether text can be entered into the location of the mouse pointer (e.g., by querying the application 130, querying the operating system of the computing system 120, or by querying the mouse module 115) (S410). If the location of the mouse pointer is not a text field or a text field has not be previously selected, the system may reset, and the client module 125 returns listening for a record event. In some embodiments, a feedback may be provided to the user to indicate that the current location cannot accept text. For example, the haptics unit 280 on the VR mouse 110 may or may not provide vibration feedback to the user, and/or the LED indicators 240 or microphone LED on the VR mouse may be activated or flash.

In various embodiments, when the client module 125 determines that the current location is an accessible text field, the client module 125 sends a notification (e.g., a record notification) to the mouse module 115 to begin recording (S415). In one embodiment, the mouse module 115 invokes/activates the microphone array 245 to start capturing and recording the user's audio speech in response to receipt of the record notification. The microphone array 245 is enabled, and audio is captured and streamed as it is received, until the record button 225 is actuated again.

When the VR mouse 110 begins recording, a haptic feedback from the haptics unit 280 and/or light feedback from the microphone LEDs 255 may indicate that recording has begun. The mouse module 110 may then start recording the user's speech, and perform beamforming to improve the recording. As described above, the mouse module 115 may also preprocess the captured audio data and filter unwanted noise (S420). The preprocessed audio data is then packaged according to the communications protocol utilized by the link between the VR mouse 110 and the user's computing system 120 (e.g., Wi-Fi, Bluetooth or other communications protocol), and sent to the client module 125 as an audio event (S425).

In various embodiments, all client modules 125 subscribed to receive mouse events receive the audio data. According to one embodiment, multiple client modules 125 (e.g., operating on multiple computing systems 120) may be subscribed to receive the mouse events. In this scenario, the audio data is provided to the multiple client modules 125.

In one embodiment, the client module 125 receiving the mouse event containing the audio data repackages the data in accordance with an input format expected by the speech-to-text module 155. For example, as described above, the speech-to-text module 3155 may be a cloud-based third party speech-to-text application. The third party speech-to-text application may have an application programming interface (API) with specific requirements for opening communications and receiving an audio stream. Thus, the client module 125 may format the audio data as it is received, and stream the audio data to the speech-to-text module 155 according to the API of the speech-to-text module 155. The client module 125 then sends the formatted audio data to the speech-to-text module 155 (S430). The formatted audio data may be accompanied with a command to the speech-to-text module 155 to transcribe the received audio into text.

In various embodiments, the speech-to-text module 155 processes the received audio stream and generates a text stream (S435) using any one of various speech-to-text algorithms known in the art. The text stream is sent to the client module 125 (S440) according to the speech-to-text module's 155 API. The client module 125 receives the text stream and reformats the text stream so that it may be received by the application 130 expecting the text. The client module 125 sends the appropriately formatted text stream to the application 130 that the user is attempting to insert the dictated text (S445). Thus, the system is device agnostic since the received data text stream is in a format that is indistinguishable from other convention data input peripherals (e.g., a keyboard).

In various embodiments, the system may operate in real-time or in near real-time. Thus, the client module 125 may be receiving an audio stream from the mouse module 115 while concurrently reformatting and sending the audio stream to the speech-to-text module 155 and sending text data to the application 125. Thus, a user may see the text that he is dictating appear on a display screen coupled to the computing system 120, as he is speaking, or relatively shortly thereafter. In some embodiments, the system may process audio in bulk or in stages.

At any time the user may elect to undo a word that was dictated by selecting the undo button 230 or using the touch surface 235. Thus, the mouse module 115 may send any undo events to the client module 125. The client module 125 may then stop sending any current audio or text data stream, and request the application 3130 that the previously entered text be removed.

In one exemplary use case, a user of the VR mouse 110 invokes typical functionalities of the mouse to open the application 130 provided by the computing system 120. The application 130, according to this example, is a word processing application that receives input from both the keyboard and the VR mouse 110. The user creates a new document, or opens an existing document, and selects, via the VR mouse 110, a location of the document where text is to be inserted. Instead of typing the text using the keyboard, the user invokes the VR mouse 110 to dictate the text. In this regard, the user actuates the record button 225 on the VR mouse 110. Upon actuation of the record button 225, the VR mouse 110 actuates/invokes the microphone array 245 embedded in the mouse, and may further provide visual and/or tactile feedback to the user that dictation has been enabled.

As the user dictates into the embedded microphone, the captured audio data is filtered/preprocessed and streamed to the client module 125 as it is received. Audio is captured, filtered/preprocessed, and streamed until the record button 225 is selected again and the microphone 245 is disabled.

The client module 125 streams the received audio data to the VR system 150 over the network 140. The VR system 150 may be a default system configured into the client module, or a system selected by the user in response to prompts by the client module 120. The audio data transmitted by the client module to the VR system 150 may be formatted by the client module 120 as necessary to comply with the requirements of the receiving VR system 150.

Upon receipt of the streamed audio, the VR system 150 invokes its speech-to-text module 155 and converts the audio data into text. The VR system 150 forwards the transcribed text back to the client module 125. The client module 125 may convert the received text to the format expected by the word processing document (application 130). For example, the client module 125 may format the text as a keyboard text stream. The formatted text is provided to the application 130. The application 130 handles the input as it would handle inputs from the keyboard. In doing so, the application enters and displays the text on the word processing document as it typically would.

In the preceding description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within +30%, 20%, 10%, 5% of the stated value. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Moreover, the drawings are not necessarily to scale.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

The foregoing is illustrative of example embodiments, and is not to be construed as limiting thereof. Although a few example embodiments have been described, those skilled in the art will readily appreciate that many modifications are possible in the example embodiments without materially departing from the novel teachings and advantages of example embodiments. Accordingly, all such modifications are intended to be included within the scope of example embodiments as defined in the claims. In the claims, means-plus-function clauses are intended to cover the structures described herein as performing the recited function and not only structural equivalents but also equivalent structures. Therefore, it is to be understood that the foregoing is illustrative of example embodiments and is not to be construed as limited to the specific embodiments disclosed, and that modifications to the disclosed example embodiments, as well as other example embodiments, are intended to be included within the scope of the appended claims. The inventive concept is defined by the following claims, with equivalents of the claims to be included therein.

What is claimed is:

1. A computer mouse comprising:
    a microphone;
    a processor coupled to the microphone; and
    a memory coupled to the processor, wherein the memory stores instructions that, when executed by the processor, cause the processor to:
        detect a selection for invoking the microphone;
        capture audio speech from a user via the microphone;
        transmit the audio speech to a first client device, wherein the first client device is configured to transmit a request to convert the audio speech into first text, receive the first text corresponding to the audio speech, and provide the first text as input to a first application; and
        transmit the audio speech to a second client device configured to convert the audio speech into second text and provide the second text as input to a second application.

2. The computer mouse of claim 1, wherein the first application is separate from a speech-to-text system configured to convert the audio speech into the first text.

3. The computer mouse of claim 1, wherein the instructions further cause the processor to detect a second selection for identifying a location of a cursor.

4. The computer mouse of claim 1, wherein the mouse further includes a button, wherein the instructions that cause the processor to detect the selection include instructions that cause the processor to detect actuation of the button, wherein the instructions further cause the processor to:
    generate a mouse event in response to detecting actuation of the button;
    transmit the mouse event to the first client device;
    receive notification from the first client device; and
    invoke the microphone in response to receipt of the notification from the first client device.

5. The computer mouse of claim 4, wherein the first client device is configured to transmit the notification in response to determining that text may be entered into a location identified by a cursor.

6. The computer mouse of claim 1, wherein the microphone comprises a microphone array, and the instructions that cause the processor to capture audio speech include instructions that cause the processor to capture the audio speech from each microphone in the microphone array.

7. The computer mouse of claim 6, wherein the instructions further cause the processor to apply a beamforming algorithm to the audio speech captured from the microphone array and stream the audio speech processed with beamforming to the first client device.

8. The computer mouse of claim 1, wherein the instructions further cause the processor to perform noise filtering on the audio speech by applying at least one filter.

9. The computer mouse of claim 1 further comprising a haptics unit, wherein the haptics unit is invoked to provide a tactile feedback according to a state of the mouse.

10. The computer mouse of claim 1 further comprising a touch sensor configured to detect user proximity and power up the mouse based on the user proximity.

11. The computer mouse of claim 1, wherein the instructions further cause the processor to:
detect a third selection;
generate a mouse event in response to detecting the third selection; and
transmit the mouse event to the first client device, wherein, in response to the mouse event, the first application removes the first text from a location identified by a cursor.

12. The computer mouse of claim 1, wherein the instructions that cause the processor to transmit the audio speech to the second client device comprise instructions that cause the processor to:
transmit the audio speech to the second client device concurrently with transmitting of the audio speech to the first client device, wherein the second client device is configured to invoke a speech-to-text system to convert the audio speech into the second text and receive the second text from the speech-to-text system.

13. The computer mouse of claim 1, wherein the audio speech is converted into the first text by a speech-to-text system hosted in a cloud server.

14. The computer mouse of claim 1, wherein the audio speech is converted into the first text by a speech-to-text system hosted in the first client device.

15. A voice recognition system comprising:
a mouse including a microphone for capturing audio speech from a user; and
a computing device in communication with the mouse, the computing device including a processor and memory, the memory storing instructions that, when executed by the processor, cause the processor to:
receive audio speech from the mouse, wherein the audio speech is captured using the microphone based on selection of the mouse for invoking the microphone;
transmit a request to convert the audio speech into first text;
receive the first text corresponding to the audio speech; and
provide the first text as input to a first application,
wherein the mouse is configured to transmit the audio speech to a second client device configured to convert the audio speech into second text and provide the second text as input to a second application.

16. The system of claim 15, wherein the instructions further cause the processor to:
receive an event from the mouse; and
identify a location in the first application in response to the event, wherein the location is the location of a cursor.

17. The system of claim 15, wherein the instructions further cause the processor to:
receive an event from the mouse; and
in response to receiving the event, remove the first text from a location in the first application.

18. The system of claim 15, wherein the instructions cause the processor to transmit the request to a speech-to-text system hosted in a cloud server for converting the audio speech into the first text.

19. The system of claim 15, wherein the instructions cause the processor to transmit the request to a speech-to-text system hosted in the computing device for converting the audio speech into the first text.

20. A method for voice recognition by a mouse in communication with a computing device, the computing device running an application, the method comprising:
detecting, by the mouse, a selection for invoking a microphone included in the mouse;
capturing, by the mouse, via the microphone, audio speech from a user;
transmitting the audio speech to a first client device, wherein the computing device is configured to transmit a request to convert the audio speech into first text, receive the first text corresponding to the audio speech, and provide the first text as input to a first application; and
transmitting the audio speech to a second client computing device configured to convert the audio speech into second text and provide the second text as input to a second application.

* * * * *